Sept. 28, 1954          C. DAVIES          2,690,203

METHOD AND APPARATUS FOR MAKING SPIRALIFORM ELEMENTS

Filed June 7, 1952          5 Sheets-Sheet 1

INVENTOR.
CHARLES DAVIES
BY
Frederick Breitenfeld
ATTORNEY

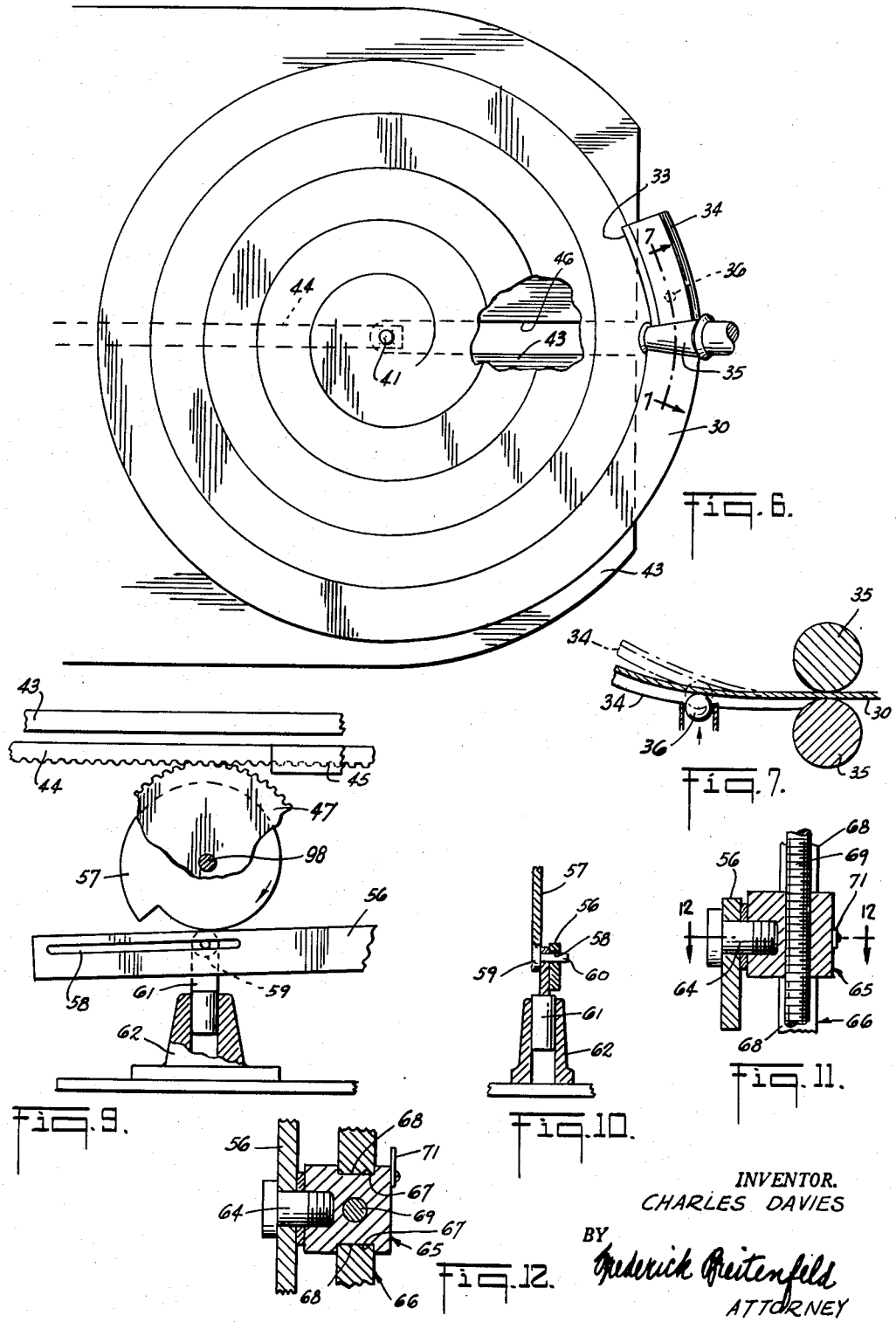

Sept. 28, 1954  C. DAVIES  2,690,203
METHOD AND APPARATUS FOR MAKING SPIRALIFORM ELEMENTS
Filed June 7, 1952  5 Sheets-Sheet 3
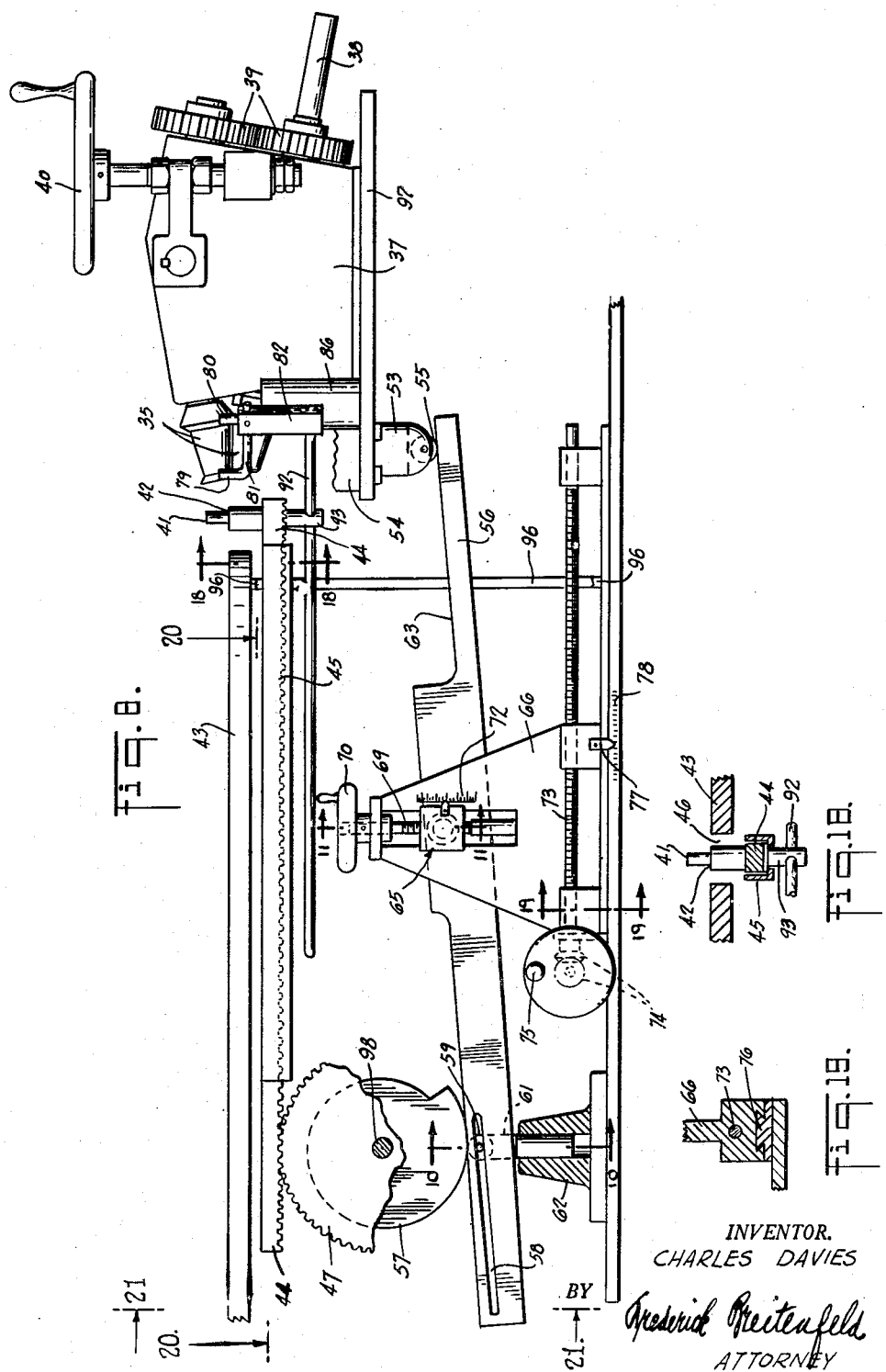
INVENTOR.
CHARLES DAVIES
BY
Frederick Breitenfeld
ATTORNEY

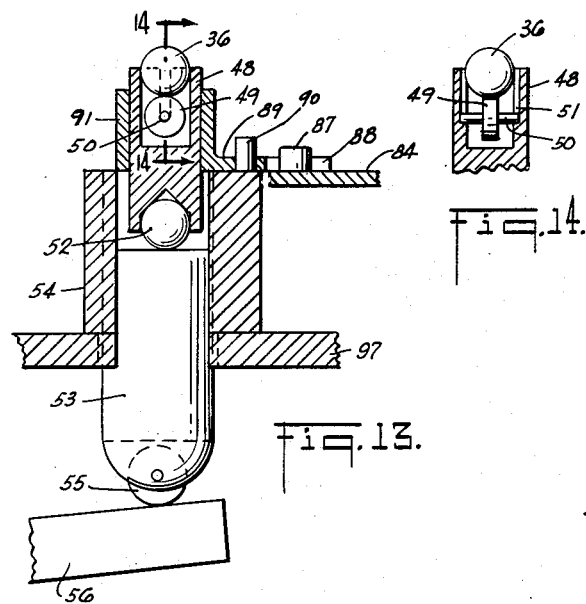
Fig. 13.
Fig. 14.
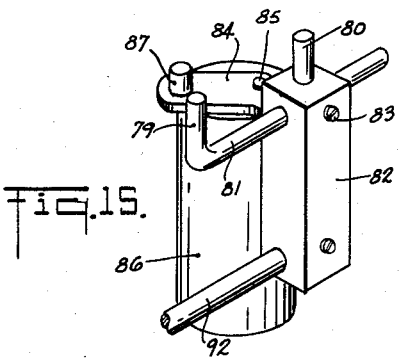
Fig. 15.
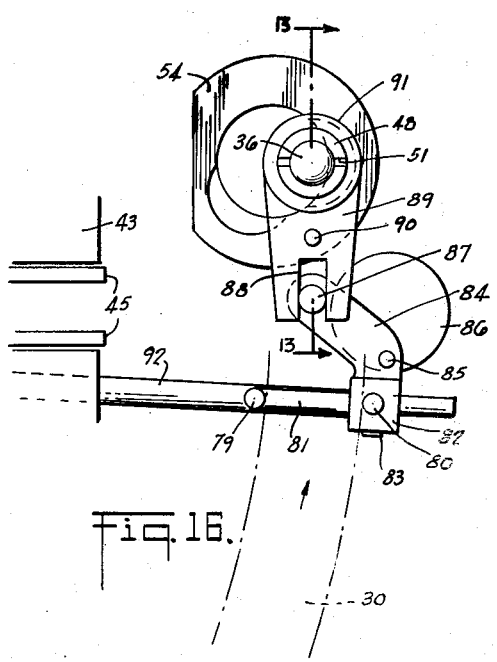
Fig. 16.
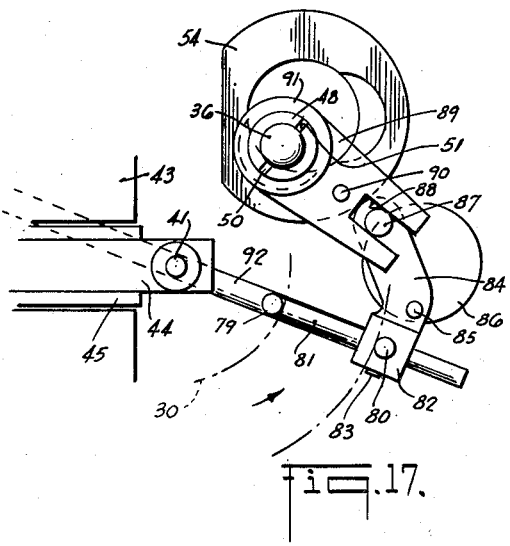
Fig. 17.
INVENTOR.
CHARLES DAVIES

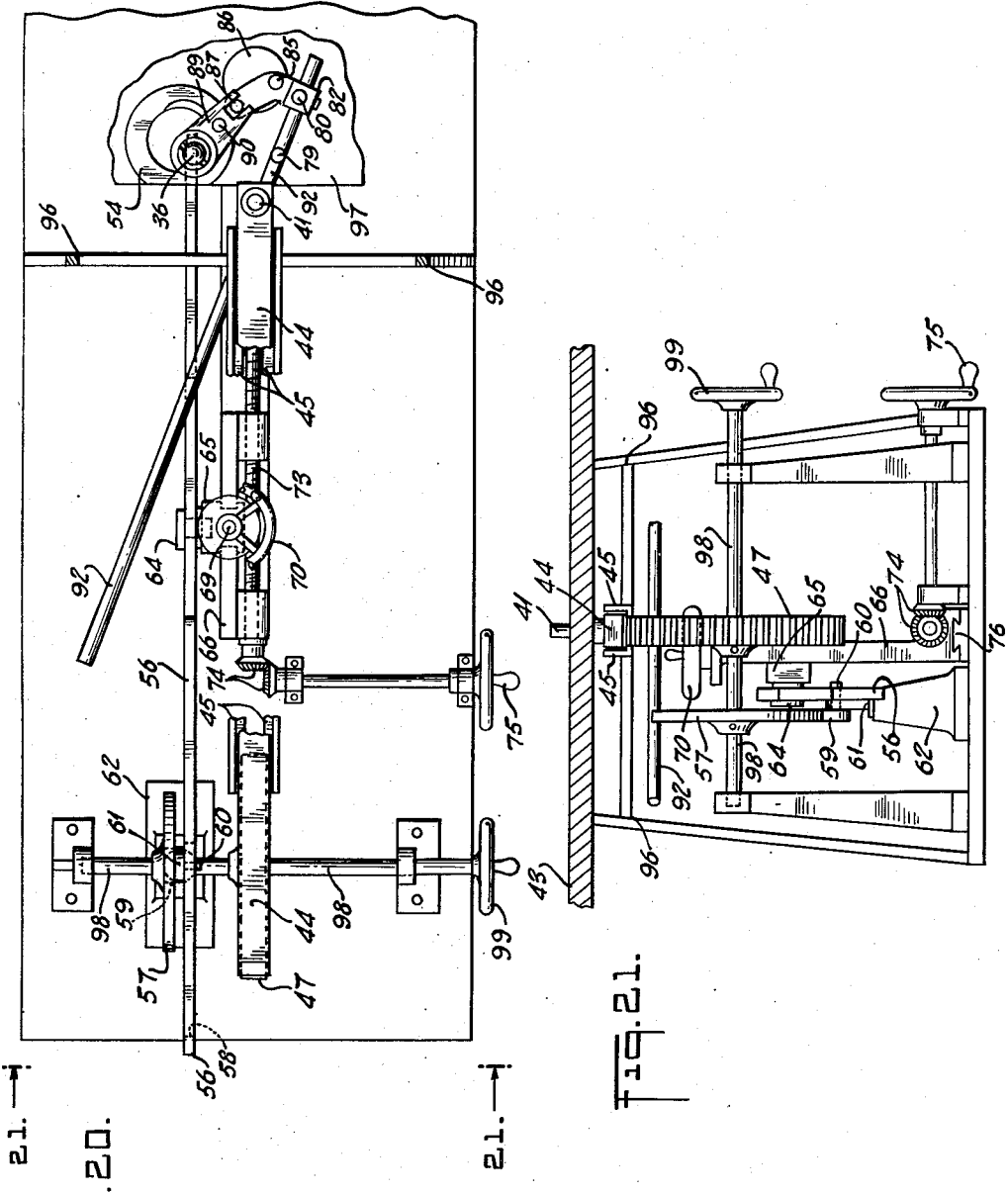

Patented Sept. 28, 1954

2,690,203

UNITED STATES PATENT OFFICE 2,690,203

METHOD AND APPARATUS FOR MAKING SPIRALIFORM ELEMENTS

Charles Davies, New Rochelle, N. Y.

Application June 7, 1952, Serial No. 292,355

18 Claims. (Cl. 153—3)

My present invention relates generally to the manufacture of spiraliform elements of deformable sheet material such as metal, and has particular reference to a method and apparatus for producing a spiraliform element whose convolutions are inclined at an angle to the axis of the spiral.

The spiraliform elements to which the invention is primarily directed are of the type which can be advantageously employed as basic parts of air diffusers intended to be secured to an air duct to spread or distribute the air as it flows outwardly into a room. An air diffuser of this kind is illustrated and described in my earlier-filed application for patent, Serial No. 272,627 filed February 20, 1952. The diffusing element there depicted is a spiraliform strip whose convolutions define a set of substantially concentric diffuser vanes inclined at an angle to the axis of the spiral and flaring outwardly into the room. The convolutions are all inclined at substantially the same angle, of the order of 30° to 60° to the spiral axis, and the convolutions are of gradually varying radius of curvature whereby the diffusing element as a whole may be said to be essentially of flat or pancake shape.

It is the objective of my invention to provide a commercially practical and economical method of forming spiraliform elements of this general type. Coordinately, it is an object of the invention to provide an apparatus of relatively simple and inexpensive character for carrying out the procedure involved.

It is a feature of the invention to form the desired element of a substantially flat spiral strip defined by making a spiral cut in a flat sheet of deformable material such as metal. The spiral along which the cut is made is an Archimedean spiral so that the strip is of substantially uniform width throughout its extent. In accordance with my invention, the strip is progressively deformed, from one end to the other, out of its original plane. In the apparatus I have devised for this purpose the strip is guided endwise, preferably outer end first, past a deforming station at which there are a pair of squeeze rolls and a pressure member. The squeeze rolls are preferably configured to angle at least one marginal region of the strip out of the plane of the strip to form a longitudinal stiffening flange, and simultaneously to impart a continuous curved deformation to the strip as a whole in the opposite direction. The pressure member is positioned to be encountered by and to exert deforming pressure upon the strip as the latter emerges from said rolls.

Among the features of the invention, contributing toward the successful and practical achievement of the desired results, are a means for adequately supporting and guiding the spiral strip as it is progressively subjected to the deforming action, and a means for automatically adjusting the parts of the apparatus to compensate for the continuously changing radii of curvature of the successive strip areas being acted upon. Of primary importance in the practice of the invention is the control of the deformation of the strip, as it progresses, in such a way that the degree of deformation is gradually increased in the more sharply curved inner regions of the spiral. To achieve this result the apparatus I have devised includes not only a means for adjusting the basic effectiveness of the deforming pressure member but also a means for causing this effectiveness to change at selected different rates of variation.

These and other features of the new procedure, and of a preferred form of apparatus for the purpose, are illustrated in the accompanying drawings, in which—

Figure 6 is a diagrammatic plan view, showing the deformation procedure in its initial phase;

Figure 7 is a diagrammatic cross-section on the line 7—7 of Figure 6;

Figure 8 is a side view of an apparatus adapted to perform the steps referred to, with the parts in the relationships they assume near the completion of the procedure;

Figure 9 is a view of the parts at the left end of Figure 8, showing the positions of the parts at or near the commencement of the procedure;

Figure 10 is a fragmentary cross-section on the line 10—10 of Figure 8;

Figure 11 is a fragmentary cross-section on the line 11—11 of Figure 8;

Figure 12 is a cross-section on the line 12—12 of Figure 11;

Figure 13 is a fragmentary cross-section on the line 13—13 of Figure 16;

Figure 14 is a fragmentary cross-section on the line 14—14 of Figure 13;

Figure 15 is a fragmentary perspective view of the guide pins and their mounting;

Figure 16 is a fragmentary plan view of the guide pins and pressure member at the commencement of the procedure;

Figure 17 is a view similar to Figure 16 showing the same parts in their relative positions at or near the completion of the procedure;

Figure 18 is a detail cross-section on the line 18—18 of Figure 8;

Figure 19 is a detail cross-section on the line 19—19 of Figure 8;

Figure 20 is a plan view taken along the plane 20—20 of Figure 8; and

Figure 21 is an end view taken substantially along the lines 21—21 of Figures 8 and 20.

Figure 1:
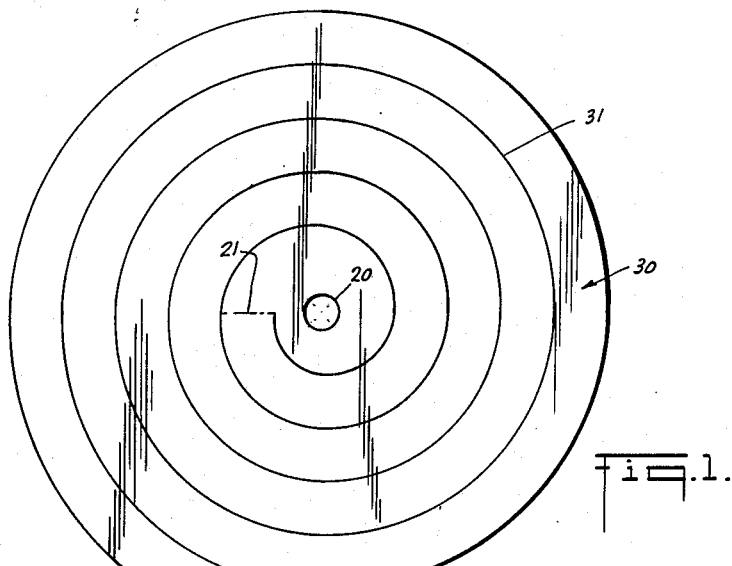
Figure 1 is a plan view of the flat spiral strip upon which the deformation is to be performed.

The basic element shown in Figure 1 is of deformable sheet material such as metal. The strip 30 is defined by a spiral cut 31. In addition, there is a radial cut 32 defining the outer end of the spiral strip, and at the center there is a hole 20 by means of which the element can be supported for rotational movement about the axis of the spiral.

At the completion of the deformation procedure, a radial cut 21 is made at the inner end of the spiral cut 31 whereby the central part of the initial blank drops away.

Figure 4:
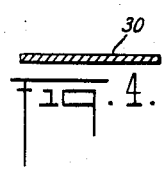
Figure 4 is a cross-section through the initial flat strip.
Figure 5:
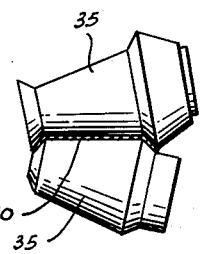
Figure 5 is a diagrammatic view showing the deformation effect of the squeeze rolls upon the cross-section of Figure 4.

By means of the present invention, the flat spiral strip 30 is progressively deformed from one end to the other. Preferably this action takes place upon successive areas of the strip, starting at its outer end. Preferably, too, the deformation includes an angling of at least one, and usually both, of the longitudinal margins of the strip so as to form a longitudinal stiffening flange. Where both margins are treated, as shown in the present drawings, two stiffening flanges result. This is achieved by means of a pair of squeeze rolls 35 (Figure 5) suitably configured and of proper dimensions to transform the strip from its initial flat state (Figure 4) into the cross-sectional shape shown in Figure 5.

The action of the squeeze rolls, as the strip passes between them, includes also a deformation of the strip as a whole in the direction opposite to that into which the flanges are bent. Thus a continuous curvature is imparted to the strip, as indicated in Figures 6 and 7. To control the degree of deformation a pressure member 36 is positioned to be encountered by, and to exert a deforming pressure upon, the strip 30 as it emerges from between the squeeze rolls. The pressure member 36 is mounted for up-and-down movement, i. e., in a direction substantially transverse to the movement of the strip it bears against, whereby its effectiveness as a pressure-exerting member may be varied, as will be pointed out more fully hereinafter.

Figure 2:
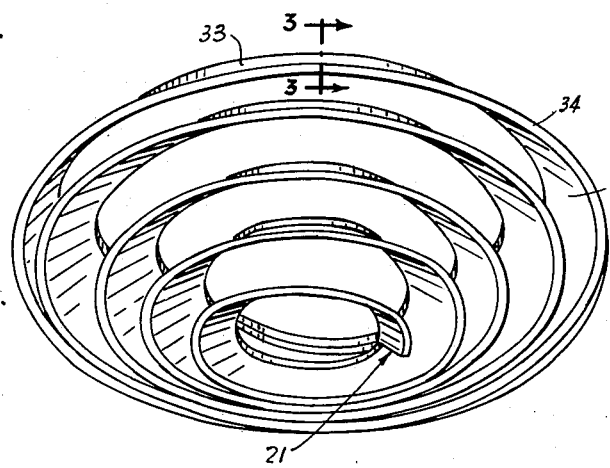
Figure 2 is a perspective view of the ultimately formed spiraliform element with the convolutions shown slightly displaced in axial direction for clearness of illustration.
Figure 3:
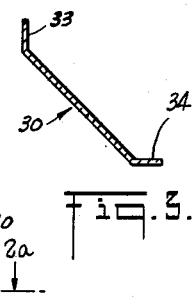
Figure 3 is an enlarged cross-section on the line 3—3 of Figure 2.
Figure 2A:
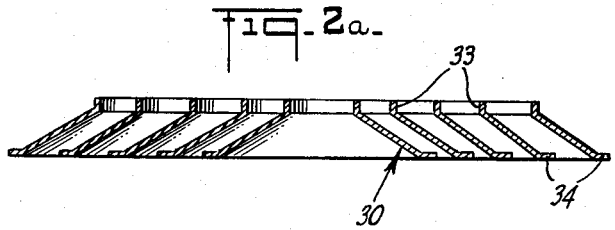
Figure 2a is a cross-sectional view, on a reduced scale, taken substantially on the line 2a—2a of Figure 2, with the convolutions in normal relationship.

The ultimate result of the procedure is shown in Figure 2. The convolutions define a series of substantially concentric vanes. They are of gradually varying curvature and impart an essentially pancake shape to the element as a whole (Figure 2a). The convolutions are inclined at an appreciable angle to the axis of the spiral, and this angularity is substantially uniform throughout, and of the order of 30° to 60°. The longitudinal stiffening flanges 33 and 34 are best indicated in Figure 3. The flange 33 on the inner edge of the convoluted strip has been shown lying substantially parallel to the spiral axis while the flange 34 on the outer edge has been shown lying substantially transverse to this axis, but these details may be varied, or one or both flanges entirely omitted, if desired.

In an apparatus for achieving this result (Figure 8) the squeeze rolls 35 may be mounted in a suitable supporting head 37 of any desired character, known per se. This head is shown resting upon a part 97 of the supporting framework of the apparatus. A drive shaft 38, rotated by a motor (not shown), imparts the rotative driving force to the rolls 35, and the drive mechanism includes the meshing gears 39 by means of which the rolls 35 are rotated in opposite directions. A control wheel 40 actuates mechanism by means of which the rolls 35 may be moved apart or brought together. Provision is also made for replacing the rolls 35 by other complementary pairs of squeeze rolls having different dimensions, contours or other characteristics. The squeeze rolls 35 and the pressure member 36 may be said to constitute a "deforming station" past which the strip is guided during its treatment.

To support the spiral strip, a pivot pin 41 is shaped to fit into the hole 20 and is provided with a shoulder 42 upon which the strip 30, in the marginal region adjacent to the hole 20, rests. To afford adequate support for the strip as a whole, a table 43 is arranged with its top surface in the plane of the shoulder 42. The table may be supported on appropriate framework uprights such as those shown at 96 in Figures 8, 20, and 21. In general, it is to be understood that not only the table 43 but also the other parts of the apparatus are mounted on a suitable base by means of legs, brackets, and other well-known expedients whose detailed representation has been omitted for the sake of clearness.

The hole 20 and pin 41 are preferably circular, but if desired the hole and pin may be made of non-circular shape in which case the pin would be mounted for rotation on its axis.

Since the center of the spiral moves toward the deforming station as the strip 30 passes between the squeeze rolls 35, the pivot pin 41 is mounted for translational movement. This may be accomplished by mounting the pin 41 at one end of a bar 44 supported for lengthwise reciprocation in a guide channel 45 formed of opposed angle bars, or of an upwardly open channel bar with a longitudinal slot in its base, as indicated in Figure 18. This channel lies directly beneath the table 43, and the table is provided with a slot 46 aligned with the channel (Figures 6 and 18) so that the pin 41 may project upwardly through it.

In Figure 6, the bar 44 is shown near its rearmost position in which the pin 41 lies furthest from the squeeze rolls 35. As the strip 30 passes between the rolls, the pin 41 and the bar 44 move gradually toward the right (as viewed in Figure 6) and by the time the squeeze rolls 35 are completing their action upon the inner more sharply curved regions of the spiral strip the pin 41 is in the right-hand position as indicated in Figures 8 and 17.

The gripping action of the rolls 35 upon the strip 30 is usually sufficient to pull the pin 41 and rack 44 from one position to the other. However, it may be conducive to smooth unimpeded operation of the apparatus to aid the shifting of the spiral center toward the squeeze rolls as the deformation of the strip progresses. To facilitate this, the bar 44 is provided with rack teeth which mesh with the teeth of a gear wheel 47; and the end of the shaft 98 on which the wheel 47 is mounted may be provided with a crank handle or wheel 99 (Figures 20 and 21) by means of which the operator may impart a suitable advancing impetus to the bar 44 during its movement toward the rolls 35. The same control wheel may be used to restore the parts to a rearward position when it is desired to mount a fresh spiral (like that of Figure 1) on the pin 41 for a repetition of the procedure.

The pressure member 36 is advantageously in the form of a ball mounted in the upper end of a sleeve 48 (Figures 13 and 14). The ball rests upon the periphery of a wheel 49 mounted on a spindle 50 which is journaled in two opposed grooves 51 on the inside of the sleeve 48. At its rear or bottom end, the sleeve rests on a ball 52 which rests on the upper face of an element 53 adapted to slide up and down within a fixed guide housing 54 supported on the framework part 97. At its lower end the element 53 carries a small wheel 55. Pressing upwardly on the wheel is the forward end of a lever 56. The fulcrum of the lever is at its midportion, and the rear end of the lever is acted upon by a cam 57 (see Figures 8 and 9) mounted on the shaft 98.

As the pivot pin 41 and the rack bar 44 move from the position of Figure 6 toward that of Figure 8, the gear 47 rotates in a clockwise direction (as viewed in Figures 8 and 9) and moves the cam 57 from the position of Figure 9 to that of Figure 8, thus gradually pressing the rear end of the lever 56 downward. This causes the forward end to move upward and to raise the pressure member 36. The latter thus moves gradually higher and higher, as a result of which its effectiveness upon the strip 30 above it becomes correspondingly greater. This is indicated in Figure 7 in which the full lines represent the deforming effect of the pressure member 36 when it is in a relatively low position, and the dotted lines show how its deforming effect is increased when it is raised. The curvature imparted to the strip 30 is thus of gradually increased magnitude in the inner more sharply curved regions of the spiral, a result which it is essential to achieve in forming the desired spiraliform element.

The rate of rise of the pressure member 36 may be varied by shifting the fulcrum of the lever lengthwise of the lever, thus varying the ratio between the lengths of the lever arms. The basic effectiveness of the pressure member is similarly variable by shifting the fulcrum and lever bodily in a direction transverse to the lever. One way of providing for these adjustments is shown in Figures 8, 10, 11 and 12.

At its forward end the lever 56 is provided with an elongated upper face 63 (Figure 8) which bears against the follower wheel 55.

At its rear end the lever 56 is provided with a longitudinal slot 58. The cam follower 59 is mounted on a pin or spindle 60 which extends through this slot. The pin 60 is also journaled in the upper end of a guide element 61 which rides up and down in a fixed guide sleeve 62.

As a result of the elongated slot 58 and the elongated face 63, the lever and its fulcrum may be shifted as a unit in the lengthwise direction of the lever without disturbing the operative relations between the lever arms and the wheels 59 and 55 respectively. Thus, a shifting of the lever and its fulcrum to the right (in Figure 8) would result in increasing the effective length of the rear lever arm and reducing that of the forward lever arm, while a rearward shifting of the lever and fulcrum would have the opposite effect.

The fulcrum of the lever is a pivot pin 64 (Figures 11 and 12) carried by a block 65 adapted to move upwardly and downwardly in a guide member 66. The latter is provided with a vertical cut-out or recess, and the block 65 is mounted in this recess and has grooves 67 in its side walls adapted to engage slidably with the opposed side edges 68 of the cut-out (see Figure 12). Extending downwardly through the block 65, and in screw-threaded relation thereto, is a worm shaft 69 whose upper end carries a crank wheel 70. By turning the latter, the block 65, and with it the lever fulcrum pin 64 and the lever 56 itself, can be shifted up and down. By providing a pointer 71 on the block 65 and a scale 72 on the member 66, or vice versa, the up and down adjustments of the lever can be reliably regulated.

In similar fashion, a worm shaft 73 extends in screw-threaded relation through the lower part of the member 66, and is rotatable by means of beveled gears 74 and a crank wheel 75 (see Figures 8, 20, and 21) to shift the member 66 in a longitudinal direction with respect to the lever 56. To facilitate this horizontal adjustment the member 66 rides in or along a suitable track such as that shown at 76 (Figure 19). A pointer 77 on the member, cooperating with a scale 78 on the fixed base, or vice versa, helps to regulate the horizontal adjustments of the lever fulcrum with greater accuracy.

At the commencement of a strip deforming operation the lever fulcrum is adjusted into the particular setting, both vertically and horizontally, which is best suited to the dimensions, deformability, and other characteristics of that particular spiral strip, and to the nature of the deforming treatment to which it is to be subjected.

Because of the decreasing radius of curvature of the strip section which is passing the deforming station at any instant of time, it is necessary to provide means for shifting the pressure member 36 in the plane of the strip as well as in the up-and-down direction hereinbefore referred to. For the same reason, the upright guide pins 79 and 80 which engage the inner and outer edges of the strip as it approaches the squeeze rolls 35, are shiftable as the strip treatment progresses. One satisfactory way of accomplishing these movements is depicted in Figures 13–17.

The guide pin 79 has a horizontal arm 81 which passes through the block 82 on which the guide pin 80 is mounted. By loosening the set-screw 83 the arm 81 can be shifted lengthwise so that the distance between the pins 79 and 80 can be regulated depending upon the width of the strip which is to be guided past the deforming station.

The block 82 is carried by a bell-crank lever 84 pivoted at anchorage 85 to a fixed part 86 of the supporting structure. The other arm of the lever 84 carries a pin 87 adapted to engage with a slot 88 in the rear arm of a lever 89 pivoted to the fixed housing 54 at anchorage 90. The forward arm of the lever 89 carries a sleeve 91 which encircles the sleeve 48.

When the pin 87 moves from the position of Figure 16 to that of Figure 17, it swings the lever 89 in a counter-clockwise direction (as viewed in these figures). The pressure member 36 is thus moved through an arc having its center at the pivot 90. To permit this arcuate swing to take place, the bore in the housing 54, in which the element 53 slides, is of somewhat arcuate cross-section as indicated in Figures 16 and 17.

Secured to the block 82 is one end of a radius rod 92 which is aligned with the plane passing through the axes of the pins 79 and 80. The rod 92 extends to, and slidably through, a pin 93 (Figure 8) projecting downwardly from the bar 44 in alignment with the spiral-supporting pin 41. The pin 93 is mounted for free rotational movement on its axis. As a result of this articulation between the bar 44 and the block 82, the axes of the pin 41 and of the guide pins 79 and 80 are always maintained in alignment. Accordingly, as the pin 41 (i. e., the axis of the spiral strip) moves toward the deforming rolls 35, the guides 79 and 80 are automatically swung from the position of Figure 16 to that of Figure 17, thus maintaining at all times their guiding contacts with the inner and outer edges of the strip. The swinging movement of the guide pins 79 and 80 takes place along an arc whose center is at the pivot 85.

The dot-and-dash lines in Figures 16 and 17 indicate the relative positions of the guides 79 and 80, and of the pressure member 96, with respect to the strip 30 when an outer (less sharply curved) region of the strip is passing the deforming station (Figure 16) and when an inner (more sharply curved) region of the strip is being acted upon by the squeeze rolls and pressure member.

Many of the structural details herein described and illustrated are intended to be merely illustrative, and it is to be understood, therefore, that changes or modifications of these details will not necessarily constitute departures from the spirit and scope of the invention as expressed in the appended claims.

Having thus described my invention and illustrated its use, what I claim as new and desire to secure by Letters Patent is:

1. The method of making a spiraliform element whose convolutions are inclined at a substantially uniform angle to the axis of the spiral, which comprises the steps of first making a spiral cut in a flat deformable sheet, thereby producing a substantially flat spiral strip, and then progressively deforming said strip, from one end to the other, out of its original plane, said deformation progressing from the outer end of the spiral inwards and being controlled so as to gradually increase the degree of deformation in the more sharply curved inner regions of the spiral.

2. The method defined in claim 1, in which at least one longitudinal margin of the strip is progressively angled out of the plane of the strip in the direction opposite to the direction of deformation of the strip as a whole, to form a continuous stiffening flange along said strip margin.

3. The method of making a spiraliform element whose convolutions are inclined at an angle to the axis of the spiral, which comprises the step or steps of forming a spiral cut in a flat sheet of deformable sheet material to define a substantially flat spiral strip, progressively moving said strip endwise past a deforming station, and subjecting said strip at said station to a deforming action which angles a longitudinal margin of the strip out of the plane of the strip and imparts a continuous curved deformation to the strip as a whole in the opposite direction, and also subjecting said strip at said station to a deforming pressure transverse to the plane of the strip in the direction of said continuous curved deformation, said pressure being gradually increased as the inner more sharply curved convolutions of the strip pass through said station.

4. In an apparatus for deforming a substantially flat spiral strip of deformable sheet material into a spiraliform element whose convolutions are inclined at a substantially uniform angle to the axis of the spiral, a supporting structure, a pair of complementary squeeze rolls carried thereby, means for supporting the flat spiral strip for rotative movement about the spiral axis and for translational movement of said axis toward said squeeze rolls, whereby the outer end of said spiral strip may be fed endwise between said rolls and the strip advanced to subject successive areas thereof to the action of said rolls, said rolls being configured to angle at least one longitudinal margin of the strip out of the plane of the strip, an adjustable pressure member positioned to be encountered by said strip as the strip emerges from said rolls, said pressure member exerting deforming pressure upon said strip in a direction transverse to the plane of the strip, and means for automatically gradually increasing the pressure of said pressure member upon said strip.

5. An apparatus having the elements of claim 4, said pressure member being mounted for reciprocating movement and said pressure increasing means comprising a pivoted lever having one arm positioned to bear against said pressure member, and means for moving the other arm of the lever to effect corresponding movement of said pressure member.

6. An apparatus as defined in claim 5, including means for shifting the fulcrum of said lever in a transverse direction.

7. An apparatus as defined in claim 6, including means for also shifting the fulcrum longitudinally to vary the effective lengths of the lever arms.

8. In an apparatus for deforming a substantially flat spiral strip of deformable sheet material into a spiraliform element whose convolutions are inclined at a substantially uniform angle to the axis of the spiral, a deforming station, means for supporting the flat spiral strip for rotative movement about the spiral axis and for translational movement of said axis toward said deforming station, whereby said strip may be guided, outer end first, past said station to subject successive areas to deformation, and means at said station for progressively imparting a continuous curved deformation to the strip in a direction generally transverse to the plane of the strip, said last-named means comprising a pair of complementary squeeze rolls between which the strip passes, and a pressure member positioned to be encountered by and to exert deforming pressure upon said strip as the latter emerges from said rolls, said pressure member being positionally adjustable in a direction at right angles to the plane of the advancing strip, and means for gradually adjusting said pressure member to increase its deforming effectiveness.

9. An apparatus as defined in claim 8, said pressure member being so formed that the part bearing against the strip is spherical in contour.

10. In an apparatus for deforming a substantially flat spiral strip of deformable sheet material into a spiraliform element whose convolutions are inclined at an angle to the axis of the spiral, a deforming station, means for guiding said flat spiral strip, outer end
station, said guiding mean
support, a pivot for rotatio
strip at the axis of the sp
mounted on said linear s movement toward and away from the deforming station, and a pair of guide pins adjacent to said station and positioned to engage said strip along its opposite longitudinal edges respectively, a rotatable support for said guide pins, and means for rotating said support for maintaining said guide pins in alignment with said pivot as the latter moves toward said deforming station.

11. In an apparatus as set forth in claim 10, said rotating means comprising a straight rod extending between and articulated to said pivot and said guide pin support, one of said articulations being slidable to compensate for the shortening of the distance between them as the pivot moves toward the deforming station.

12. In an apparatus for deforming a substantially flat spiral strip of deformable sheet material into a spiraliform element whose convolutions are inclined at an angle to the axis of the spiral, a deforming station, means for guiding said flat spiral strip, outer end first, past said station, said guiding means including a linear support, a pivot for rotationally supporting said strip at the axis of the spiral, said pivot being mounted on said linear support for translational movement toward and away from the deforming station, a pair of guide pins adjacent to said station and positioned to engage said strip along its opposite longitudinal edges respectively, a movable support for said guide pins, and means controlled by the movement of said pivot toward the deforming station for moving said support (a) rotationally to maintain said guide pins in alignment with the pivot and (b) translationally toward the pivot to compensate for the diminishing radius of curvature of said strip.

13. An apparatus for deforming a substantially flat spiral strip of deformable sheet material into a spiraliform element whose convolutions are inclined at an angle to the axis of the spiral, comprising a supporting structure, a pair of squeeze rolls mounted thereon, means for supporting the flat spiral strip for rotative movement about the spiral axis and for translational movement of said axis toward said squeeze rolls so that said strip may be passed between said squeeze rolls, outer end first, to subject successive areas to the action of said rolls, a pair of guide pins adjacent to said squeeze rolls and positioned to engage said strip along its opposite longitudinal edges respectively as the strip approaches said squeeze rolls, a pressure member positioned to be encountered by and to exert deforming pressure upon said strip as the latter emerges from between said rolls, and means for imparting translational movements to said guide pins and pressure member to compensate for the diminishing radius of curvature of the spiral strip at it moves past said squeeze rolls.

14. An apparatus as set forth in claim 13, said last-named means comprising a pivoted element on which said guide pins are supported, another pivoted element on which said pressure member is supported, and interengaging parts on said pivoted elements adapted to cooperate so that the pivoting of one is accompanied by a corresponding pivoting of the other.

15. An apparatus as set forth in claim 13, said last-named means comprising a pair of fixed anchorages, an element pivoted to one of said anchorages and supporting said guide pins, another element pivoted to the other of said anchorages and supporting said pressure member, and interengaging parts on said pivoted elements adapted to cooperate so that the pivoting of one is accompanied by a corresponding pivoting of the other.

16. An apparatus as set forth in claim 13, said last-named means comprising a pair of fixed anchorages, an element pivoted to one of said anchorages and supporting said guide pins, another element pivoted to the other of said anchorages and supporting said pressure member, means controlled by the movement of the spiral axis toward the squeeze rolls for pivoting one of said pivoted elements, and interengaging parts on said pivoted elements adapted to cooperate so that the pivoting of one is accompanied by a corresponding pivoting of the other.

17. An apparatus as set forth in claim 13, said last-named means comprising a pair of fixed anchorages, an element pivoted to one of said anchorages and supporting said guide pins, another element pivoted to the other of said anchorages and supporting said pressure member, means controlled by the movement of the spiral axis toward the squeeze rolls for so pivoting the element that supports the guide pins that they are maintained in alignment with said axis, and interengaging parts on said pivoted elements adapted to cooperate so that the pivoting of one is accompanied by a corresponding pivoting of the other.

18. An apparatus as set forth in claim 13, said last-named means comprising a pair of fixed anchorages, an element pivoted at its midportion to one of said anchorages and supporting said guide pins at its outer end, another element pivoted to the other of said anchorages and supporting said pressure member at its outer end, the inner ends of said pivoted elements being articulated so that the pivoting of one is accompanied by a corresponding pivoting of the other, and means controlled by the movement of the spiral axis toward the squeeze rolls for so pivoting the element that supports the guide pins that they are maintained in alignment with said axis, said last-named means comprising a straight rod extending between and articulated to the strip supporting means and to the guide pin supporting element, said rod and said articulations being aligned with the spiral axis and with the guide pins.

References Cited in the file of this patent

UNITED STATES PATENTS

| Number | Name | Date |
|---|---|---|
| 83,200 | Parkin | Oct. 20, 1868 |
| 93,181 | Cushing | Aug. 3, 1869 |
| 153,028 | Wiggin | July 14, 1874 |
| 373,696 | Spruce | Nov. 21, 1887 |
| 435,381 | Rohrmoser | Aug. 26, 1890 |
| 1,288,147 | Nystrom | Dec. 17, 1918 |
| 1,710,262 | Kellogg | Apr. 23, 1929 |
| 1,926,778 | Kurth | Sept. 12, 1933 |
| 2,262,227 | Fulson | Nov. 11, 1941 |
| 2,305,354 | Kellogg | Dec. 15, 1942 |
| 2,306,374 | Allardt | Dec. 29, 1942 |
| 2,308,432 | Johnson | Jan. 12, 1943 |
| 2,621,735 | Webb | Dec. 16, 1952 |

FOREIGN PATENTS

| Number | Country | Date |
|---|---|---|
| 396,468 | Great Britain | Aug. 10, 1933 |
| 484,056 | Great Britain | Apr. 29, 1938 |
| 166,131 | Switzerland | Mar. 1, 1934 |